P. G. SULLIVAN.
VALVE STEM.
APPLICATION FILED MAY 12, 1919.

1,325,544.

Patented Dec. 23, 1919.

Witness

Inventor
P. G. Sullivan
By C. A. Snow & Co.
Attorneys

UNITED STATES PATENT OFFICE.

PATRICK G. SULLIVAN, OF HATTIESBURG, MISSISSIPPI, ASSIGNOR OF ONE-HALF TO JOSHUA WM. DYESS, OF HATTIESBURG, MISSISSIPPI.

VALVE-STEM.

1,325,544.

Specification of Letters Patent.

Patented Dec. 23, 1919.

Application filed May 12, 1919. Serial No. 296,551.

*To all whom it may concern:*

Be it known that I, PATRICK G. SULLIVAN, a citizen of the United States, residing at Hattiesburg, in the county of Forrest and State of Mississippi, have invented a new and useful Valve-Stem, of which the following is a specification.

This invention relates to improvements in valve stems, the object of the invention being to provide an improved valve stem having a packing member secured thereto and traveling therewith, the construction being such that wear on the valve stem is entirely eliminated.

A further object of the invention is the provision of a device of the character set forth which is extremely simple in construction and highly efficient in use.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

The same characters of reference designate the same parts in the different figures of the drawings.

Figure 1:
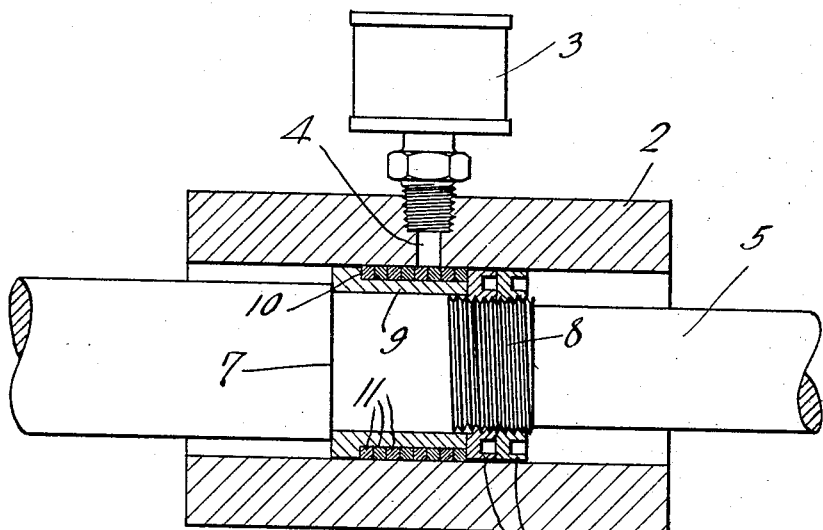
Figure 1 is a longitudinal section through a stuffing box and showing a valve stem made in accordance with the present invention and having a packing member secured thereon, the valve stem being broken away at its ends.
Figure 2:
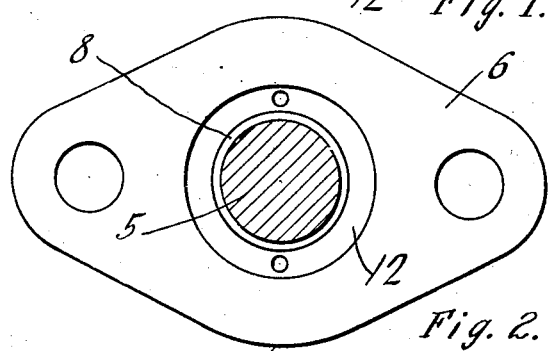
Fig. 2 is an end view of the stuffing box.
Figure 3:
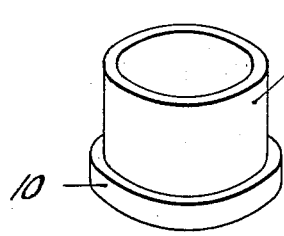
Figs. 3, 4 and 5 are perspective views of the members forming the packing.

It has been the usual practice heretofore where valve stems pass through a stuffing box, to provide a packing adapted to be seated in the end of the stuffing box, through which the valve stem slips, whereby considerable wear of both the packing and the stem is produced, so that after comparatively short use the joint is not steam tight. The object of the present invention, therefore, is to provide a packing that travels with the stem and which is provided with expansible members, whereby the wear will be entirely on the stuffing box and expansible members, which latter will expand and take up such wear, thereby producing a joint that will remain tight for a very much longer time than the stuffing box joint as ordinarily provided.

Referring to the drawings, 2 designates a stuffing box, which may be merely a cylindrical member provided with an oil cup 3 communicating with the interior of the cylinder by means of a channel 4 and having perforated lugs 6 projecting from the sides thereof for bolting the stuffing box in place.

Figure 4:
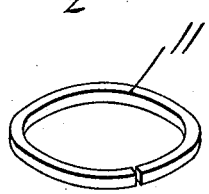
Figure 5:
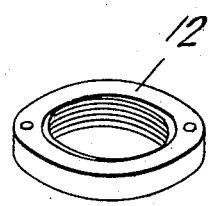

My improved valve stem 5 is adapted to reciprocate in the stuffing box, and is provided with an enlarged portion forming a shoulder 7 and with a threaded portion 8 at some distance from such shoulder. The packing consists of a sleeve 9, provided with an annular outwardly extending flange 10 having an exterior diameter of a size to form a loose fit with the interior of the stuffing box with which it is to be used. A plurality of expansion rings 11, one of which is shown in Fig. 4, encircle the smaller portion of the sleeve, and the latter is placed on the valve stem with its end 10 abutting against the shoulder 7 of the stem. A pair of nuts 12, one of which is shown in Fig. 5, are adapted to be screwed on the stem, thereby to lock the sleeve 9 firmly against the shoulder 7 as well as to retain the rings 11 on the sleeve. From this construction it will readily be seen that there is absolutely no wear whatsoever on the valve stem, and whatever wear there may be between the stuffing box and rings is quickly taken up by the expansion of said rings.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claim hereto appended.

Having thus described my invention, what I claim is:

A valve stem having a shoulder, a sleeve provided with an outwardly extending annular flange and mounted on said stem with its end in contact with the shoulder of the stem, a pair of nuts threaded on said stem and adapted to maintain the end of said sleeve in contact with the stem shoulder, and a plurality of expansible rings encircling said sleeeve and clamped between said nuts and the flange carried by the sleeve.

In testimony that I claim the foregoing as my own, I have hereto affixed my signature in the presence of two witnesses.

PATRICK G. SULLIVAN.

Witnesses:
 P. B. JOHNSON,
 E. L. SUMMERS.